Dec. 9, 1969
W. P. MOORE ET AL
3,482,933
PROCESS FOR THE PRODUCTION OF PHOSPHORIC ACID
AND CALCUIM ALUMINATE
Filed Jan. 24, 1967
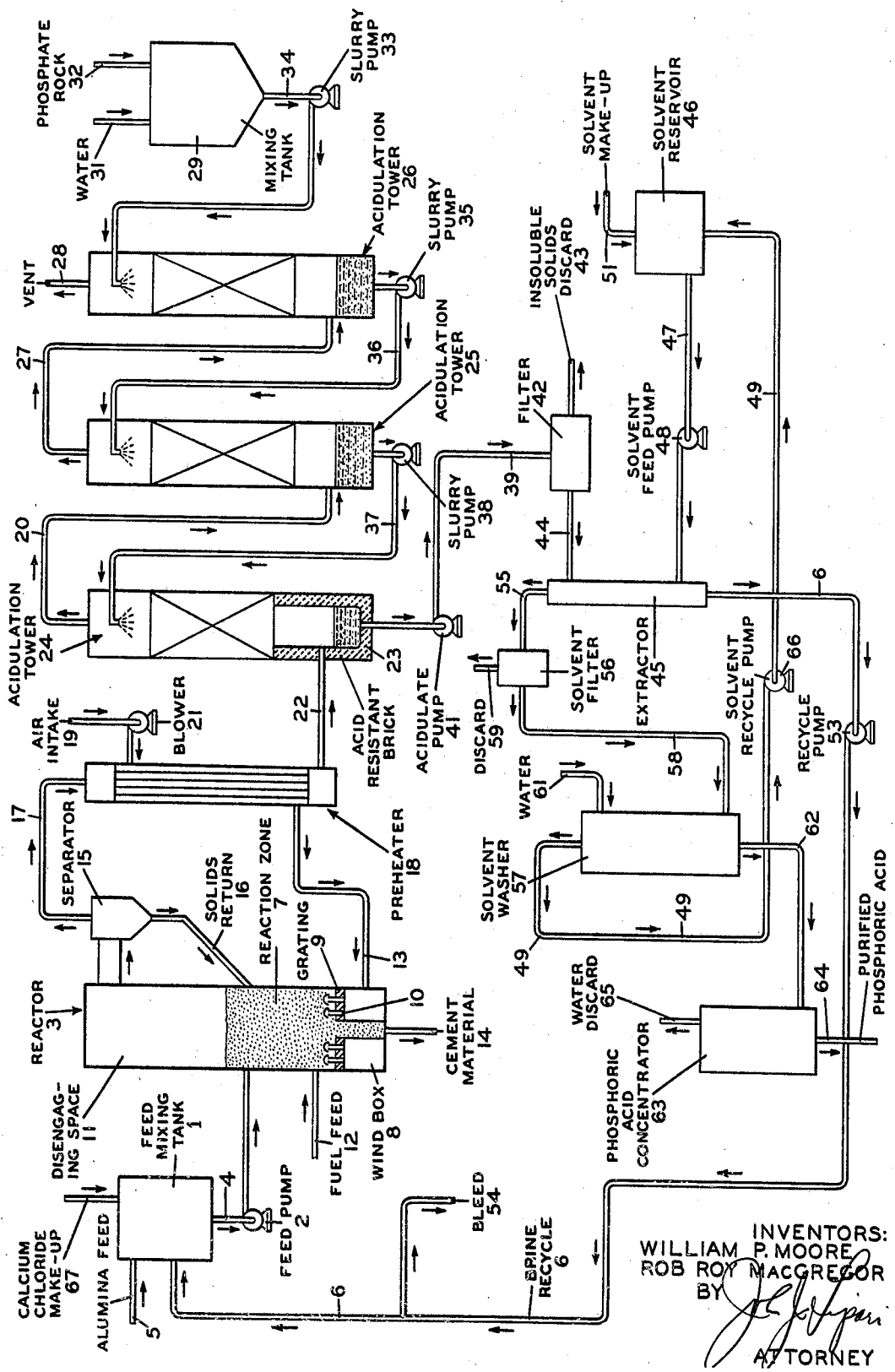
INVENTORS:
WILLIAM P. MOORE
ROB ROY MACGREGOR
BY
ATTORNEY

United States Patent Office 3,482,933
Patented Dec. 9, 1969

3,482,933
PROCESS FOR THE PRODUCTION OF PHOSPHORIC ACID AND CALCIUM ALUMINATE
William P. Moore, Chester, and Rob Roy MacGregor, Hopewell, Va., assignors to Allied Chemical Corporation, New York, N.Y., a corporation of New York
Filed Jan. 24, 1967, Ser. No. 611,443
The portion of the term of the patent subsequent to Apr. 29, 1986, has been disclaimed
Int. Cl. C01f 7/16, 11/24; C01b 25/18
U.S. Cl. 23—52                    5 Claims

ABSTRACT OF THE DISCLOSURE

A continuous process for producing orthophosphoric acid which involves the treatment of a moving aqueous slurry of phosphate rock with a countercurrent stream of vapor-phase hydrochloric acid. The by-product calcium chloride brine is reacted directly with alumina in a fluidized bed of alumina and calcium aluminate at the combustion temperature of a fluid hydrocarbon fuel burned within the bed to yield calcium aluminate which is useful for making cement, and hydrochloric acid, which is recycled.

BACKGROUND OF THE INVENTION

Our invention relates to the production of orthophosphoric acid (hereinafter referred to as phosphoric acid). More particularly, it relates to a continuous process for producing phosphoric acid for which the raw materials required are alumina and phosphate rock, and from which a material suitable for making cement is obtained as a by-product.

The reaction between alumina-containing clays and hydrated calcium chloride has been previously conducted on a laboratory scale to produce hydrogen chloride and calcium aluminate (F. K. Mikhailov, L. M. Volova, and L. S. Kovalenko, Khim. Prom., 1964, 595). However, attempts at scaling up the reaction to produce large quantities of calcium aluminate and hydrogen chloride have, up to now, been unsuccessful.

SUMMARY OF THE INVENTION

Accordingly, one object of the present invention is to provide an efficient and economical process for reacting hydrated calcium chloride with alumina to produce hydrogen chloride and calcium aluminate, the latter being suitable for making cement.

Another object of the invention is to provide a process for producing phosphoric acid by reacting hydrochloric acid with phosphate rock.

Another object of the invention is to provide a process for producing phosphoric acid from alumina and phosphate rock.

Yet another object of the invention is to provide a continuous process for producing phosphoric acid from alumina and phosphate rock with concomitant formation of material comprising calcium aluminate (hereinafter referred to as cement material).

Other objects and a fuller understanding of the invention may be had by referring to the following description and claims.

In accordance with our invention, we have discovered conditions under which hydrated calcium chloride can be made to react with alumina on a large scale in a fluidized bed comprising calcium aluminate and alumina. Fluidization of the bed and reaction between the hydrated calcium chloride and alumina are achieved by passing heated gas upward through the bed at a temperature between 600° and 1300° C., preferably between 700° and 950°, which is sufficient to effect reaction. In particular, temperatures within this range are easily attained and maintained by burning a fluid hydrocarbon fuel (gas or liquid) directly within the bed. Fluidization is most efficient when the rate of flow of gases through the bed is such that the bed is expanded 20% to 70%, and preferably 30–50% over its volume with no gas flow.

The alumina-containing particles which constitute the fluidized bed and which serve as the source of alumina in the reaction, are most conveniently (but not necessarily) derived from naturally occurring commercial sources such as bauxite. Furthermore, the alumina and calcium aluminate which constitute the fluidized bed may be characterized as having a particle size of substantially between about 5 and about 100 U.S. mesh and preferably between about 10 and about 50 U.S. mesh. Bed particles within this size range will be large (i.e. heavy) enough to minimize the entrainment of solid particles ("fines") by the upwardly flowing gaseous products of combustion and reaction (hereinafter referred to as flue gas), while being at the same time small enough to present a sufficiently large (i.e., "effective") surface area to insure intimate contact of alumina with hydrated calcium chloride.

It is to be understood that the term "hydrated calcium chloride" means any of the several chemical complexes of calcium chloride with water, in particular $CaCl_2 \cdot 6H_2O$. Also, the hydrated calcium chloride is preferably (but not necessarily) employed in the form of an aqueous solution ("brine"). The calcium chloride-containing brine and alumina are fed into the fluidized bed reaction system preferably in the form of a mixture, or slurry. The brine and the hydrocarbon fuel serve as the source of water for the reaction.

The alumina-containing particles (hereinafter referred to as alumina sand) and hydrated calcium chloride are introduced into the fluidized bed in amounts such that the molar ratio of alumina to calcium chloride will be at least about 0.85:1, preferably between about 0.85:1 and about 3.0:1 and desirably at about 1:1. If the fluidized bed is operated in accordance with the above recommended proportions of reactants, and if the rate of addition to and withdrawal from the fluidized bed are controlled so as to insure completeness of reaction within the bed, then the solid material withdrawn will comprise essentially calcium aluminate. We have further found that the amount of unreacted calcium chloride present in the fluidized bed is crucial for smooth operation of the bed. Thus, agglomeration or "sticking" of the particles in the fluidized bed will occur (with possible loss of fluidization) unless the amount of unreacted calcium chloride is kept below about 15% by weight, preferably below about 5%, and desirably below about 3%.

We have further found that the flue gas, which contains less than about 10% and usually about 2% to about 8% by weight of hydrogen chloride, can be directly and effectively reacted with calcined or uncalcined phosphate rock to produce phosphoric acid. In accordance with the method of our invention, the flue gas is contacted with an aqueous slurry comprising between about 10% and about 50%, preferably between about 20% and about 40% by weight of phosphate rock within a reaction chamber containing an inert packing material. The slurry is passed through the reaction chamber countercurrent to the stream of hydrogen chloride-containing flue gas. We have also found that if the above slurry contains more than about 50% by weight of phosphate rock then plugging of the reaction chamber occurs, and if the slurry contains less than about 10% by weight of phosphate rock, then the rate of production and concentration of phosphoric acid become too low. The phosphate rock used to form the slurry is ground prior to mixing with water so that about 80% of the particles have a size below 50 U.S. mesh. It is another feature of our invention that the intimate contacting of flue gas and phosphate rock slurry is conducted at a temperature between about 85° and about 110° C., preferably between about 90° and about 99° C. at atmospheric pressure to effect rapid reaction between the phosphate rock and hydrochloric acid and also to minimize condensation of water within the reaction chamber. In this manner, there is obtained an aqueous reaction product containing from about 5% to about 15% and usually between about 8% and about 10% by weight of phosphoric acid together with by-product calcium chloride and minor amounts of solid matter. Virtually complete consumption of hydrogen chloride with very little carry-over thereof into the acidulate may be accomplished by using a plurality of reaction vessels connected in series and maintaning the temperatures therein below but near the boiling point of the aqueous phase within the reaction chamber.

The aqueous reaction product is subjected to purification by methods known to the various arts whereby 80% pure phosphoric is obtained. The calcium chloride-containing aqueous residue ("brine raffinate") is recycled back to the fluidized bed for reaction with additional alumina.

Further objects of the invention may be had by referring to the accompanying drawing which is a flow diagram of the process of our invention.

DESCRIPTION OF THE DRAWING

Referring to the drawing, feed mixing tank 1 is shown connected through feed pump 2 to reactor 3 by means of supply line 4. Alumina sand, recycled calcium chloride brine, and hydrated calcium chloride make-up are fed continuously into feed mixing tank 1 by supply lines 5, 6 and 67, respectively. Supply lines 5 and 67 are each provided with suitable control means (not shown) whereby the rate of flow of feed materials can be varied. The rate of flow of calcium chloride brine through supply line 6 is controlled by recycle bleed line 54.

Reactor 3 is constructed of carbon steel pipe lined with one course each of insulating and refractory brick. Reaction zone 7 within reactor 3 is a bed of solid particles comprising essentially alumina sand and calcium aluminate which is supported above wind box 8 by means of grating 9. Grating 9, which is constructed of a load-bearing, heat-resistant material, is provided with a plurality of vents or distributors 10, preferably (but not necessarily) of the bubble-cap type which permit the upward passage of gases while at the same time preventing solid material from falling down into wind box 8. Wind box 8 may be used as a combustion chamber for fuel gas, and, in conjunction with grating 9, serves as a means for uniformly sparging combustion gases or preheated air into reaction zone 7, thereby achieving a state of fluidization within reaction zone 7. Cement material is withdrawn at a controlled rate from reactor 3 through charge line 14. The sites of addition and withdrawal of solid materials from reaction zone 7 are kept as far apart as possible in order to maximize the average retention time of solid reactants within reaction zone 7 (1 to 20 hours; preferably 2 to 10 hours). In practice, the sites of addition to and withdrawal from reactor 3 are located at the top and bottom, respectively, of reaction zone 7. In this way, too, the force of gravity can be used to aid withdrawal of solid material.

The inertness of alumina toward acid precludes its reaction with product hydrogen chloride. Furthermore, the high specific heat of alumina sand makes it an excellent insulating material, thereby creating, as it were, an effective "heat sump" within the reactor itself. This property of the sand-filled fluidized bed permits economical operation of our process on a large scale at high temperatures.

Reactor 3 also contains disengaging space 11 situated above reaction zone 7 where the flue gas, which comprises steam, hydrogen chloride, and combustion products, is freed of most of the suspended solids ("fines"). Disengaging space 11 extends to a height equal to approximately twice the depth of reaction zone 7. Fluid hydrocarbon fuel is fed into reactor 3 at a point near the bottom of reaction zone 7 by means of supply line 12. Preheated air is fed into wind box 8 through supply line 13. The rates of flow of fuel and air through supply lines 12 and 13 may be varied by suitable control means (not shown).

The flue gas is drawn from disengaging space 11 into separator 15 (preferably of the "cyclone" type) which removes any remaining fines from the flue gas and returns them to reactor 3 through solids return line 16. The solids-free flue gas leaves cyclone separator 15 through line 17 and passes through air preheater 18, which is preferably but not necessarily of the "tube-and-shell" type. Within preheater 18, the hot flue gas undergoes heat exchange with the air to be used for combustion and fluidization. We have found that this heat exchange process is most efficient when the final temperature of the flue gas and air for combustion and fluidization is between about 350° and 450° C., preferably between about 400° and about 425° C. The air for combustion and fluidization is drawn into preheater 18 through air intake line 19 with the aid of air blower 21, and leaves by way of supply line 13 leading to wind box 8 of reactor 3.

The partially cooled flue gas passes directly through line 22 into the lower portion of acidulation tower 24 lined with acid-resistant brick 23, where it is cooled to about 100° C. The flue gas then flows through acidulation towers 24, 25 and 26 in series by entering the bottom of each tower and passing out of the top. Line 20 serves to transport the flue gas from tower 24 to tower 25. Line 27 serves to transport the flue gas from tower 25 to tower 26. The spent flue gas leaves the top of acidulation tower 26 through vent 28. The upper portion of acidulation tower 24 and all of acidulation towers 25 and 26 are of rubber-lined carbon steel construction and filled with an inert, solid absorption packing such as polypropylene. The pressure within the tower is essentially atmospheric.

Water and uncalcined phosphate rock are fed into mixing tank 29 through supply lines 31 and 32 which are provided with suitable control means (not shown) whereby the rates of flow of feed materials can be varied. The resulting phasphate rock slurry is fed continuously by slurry pump 33 through line 34 to the top of acidulation tower 26. Slurry is then withdrawn from the bottom of tower 26 and fed by slurry pump 35 through line 36 to the top of tower 25 and then from the bottom of tower 25 to the top of tower 24 through line 37 by slurry pump 38. Acidulate liquor is withdrawn from the bottom of tower 24 through outlet duct 39 and pumped by acidulate pump 41 to acidulate filter 42, wherein insoluble material is separated and discarded through discard line 43.

Acidulate filter 42 is connected through line 44 to extractor 45, wherein the crude phosphoric acid solution is extracted with a water-immiscible, phosphoric acid-miscible solvent supplied to extractor 45 by solvent feed pump 48. Solvent is supplied to solvent reservoir 46 through solvent recycle line 49 and solvent make-up line 51. Illustrative of the water-immiscible, phosphoric acid-miscible solvents suitable for use in the process of our invention are n-butanol, sec-butanol, aliphatic alcohols containing 5 carbon atoms, triethyl phosphate, and N,N-disubstituted organic amides derived from monocarboxylic acids having from 1 to 3 carbon atoms and N,N-dialkyl amines whose alkyl groups contain 1 or 2 carbon atoms.

The brine raffinate formed in extractor 45 is withdrawn through recycle line 6 with the aid of recycle pump 53. Recycle line 6 is connected to feed mixing tank 1 and recycle bleed line 54.

The phosphoric acid-containing extract is removed from extractor 45 through line 55, filtered in solvent filter 5, and passed into solvent washer 57 through line 58, wherein the phosphoric acid is continuously extracted with water. Filtered solids are removed from solvent filter 56 through filter discard line 5. Water is supplied to solvent washer 57 by supply line 61.

The phosphoric acid-containing aqueous phase formed in solvent washer 57 is passed through line 62 into phosphoric acid concentrator 63, wherein the phosphoric acid is freed of excess water to give 80% phosphoric acid. Such separation of water from phosphoric acid may be performed by any of several methods known in the chemical arts, for example by distillation. The phosphoric acid thus purified is withdrawn through outlet duct 64. Water is removed through solvent discard line 65.

The solvent phase formed in solvent washer 57 is withdrawn through line 49 and pumped back to solvent reservoir 46 with the aid of solvent recycle pump 66.

DESCRIPTION OF THE PREFFERED EMBODIMENT

The conditions specified in this example are for steady state operation. At the start of the process, reaction zone 7 consists essentially of alumina sand. Temperatures are in degrees centigrade and percentages are by weight unless otherwise specified.

Feed to reactor 3 was continuously formed in mixing tank 1 by adding 550.7 pounds per hour of recycle brine containing 22.8% calcium chloride through line 6 and 164 pounds per hour of alumina sand containing 88.2% $Al_2O_3$, 7.8% $SiO_2$ and 4% other components through line 5. Also, 79.8 pounds per hour of 41.1% aqueous calcium chloride solution was continually mixed with these feeds through line 67. The slurry of calcium chloride brine and alumina sand was fed by feed pump 2 through line 4 at the rate of 794.5 pounds per hour, and was introduced into reactor 3 at the top of reaction zone 7. Reactor 3 was 20 feet tall and had an outside diameter of 36 inches and an inside diameter of 18 inches. Reactor 3 was provided with a fluidizing grating 9 containing 5 bubble-capped air distributors 10. Grating 9 was located 4 feet from the bottom of reactor 3 and contained solids discharge line 14 for removal of product solids through the center of wind box 8. Preheated air was introduced into reaction zone 7 at the rate of 1640 pounds per hour at about 450° through grating 9 via line 13. Initially, reaction zone 7 comprised essentially alumina sand, and was preheated to 700° by combustion gases originating below grating 9. When reaction zone 7 reached a temperature of 700°, natural gas fuel was introduced into reaction zone 7 through the reactor wall by line 12 at a point about 1 foot above grating 9 and at a rate of 90.9 pounds per hour. The gas was quickly dispersed within the fluidized bed and spontaneous combustion occurred smoothly on the surface of the alumina sand particles. Temperatures throughout reaction zone 7 were within a few degrees of 850°. Reaction zone 7 extended about 5 feet above grating 9. Above reaction zone 7 were 10 feet of disengaging space 11. Most calcium aluminate fines were agglomerated but some were swept out of reaction zone 7 into disengaging space 11 by the flue gas. They were recovered in cyclone separator 15 and returned directly to reactor 3 through line 16. The pressure within reactor 3 was about 6 p.s.i.g. Solid product was withdrawn continuously from reactor 3 through discharge line 14 at the rate of 262 pounds per hour. It gave the following analysis:

| Component: | Weight percent |
|---|---|
| $CaAl_2O_4$ | 85.6 |
| $CaSiO_3$ | 0.8 |
| $Al_2O_3$ | 4.7 |
| $Fe_2O_3$ | 0.4 |
| MgO | 0.2 |
| $P_2O_5$ | 1.2 |
| Other | 7.2 |

This product had good flow characteristics and was not dusty. It was mixed with an equal part by weight of lime and tested as a cement material. The resulting properties were found to be quite similar to those of Portland cement. Gaseous products of reaction and combustion were removed from cyclone separator 15 through line 17 and passed through tube and shell type air preheater 18. By means of heat interchange, the air for combustion and fluidization was preheated to about 450° and the flue gas was cooled to about 400°. The partially cooled flue gas was removed from preheater 18 through line 22 at the rate of 2265.9 pounds per hour with analysis as follows:

| Component: | Weight percent |
|---|---|
| HCl | 4.9 |
| $H_2O$ | 27.7 |
| $CO_2$ | 11.3 |
| $N_2$ | 56.1 |

This hydrogen chloride-containing flue gas was contacted with phosphate rock to produce phosphoric acid in three acidulation towers 24, 25, and 26. First, however, the flue gas was cooled to 98° in an acid brick-lined lower portion of acidulation tower 24. Each tower was 8 feet high and 12 inches in diameter. Aqueous phosphate rock slurry was made in mixing tank 29 by mixing 485.8 pounds per hour of water brought in through line 31 and 161.9 pounds per hour of uncalcined phosphate rock brought in through line 32. The phosphate rock was preground to about 50 U.S. mesh and had the following composition (the calcium phosphate in the sample was converted to phosphorus pentoxide and calcium oxide to facilitate analysis):

| Component: | Weight percent |
|---|---|
| $P_2O_5$ | 31.2 |
| CaO | 45.5 |
| $Al_2O_3$ | 1.7 |
| $Fe_2O_3$ | 0.5 |
| MgO | 0.3 |
| $(CO_3)^{-2}$ | 3.35 |
| $F^-$ | 3.3 |
| Organic carbon | 1.7 |
| $SiO_2$ | 7.8 |
| Other | 4.7 |

The aqueous phosphate rock slurry was fed continuously by slurry feed pump 33 through line 34 at the rate of 647.7 pounds per hour to the top of acidulation tower 26. Liquid was then withdrawn from the bottom of tower 26 through line 36 and fed by slurry pump 35 to the top of tower 25 and then from the bottom of tower 25 through line 37 to the top of tower 24 with the aid of slurry pump 38. Acidulate liquor containing a small amount of undissolved solid was withdrawn from the bottom of tower 24 through line 39 and pumped by acidulate pump 41 to acidulate filter 42. The cooled flue gas flowed countercurrently through the acidulation towers in series by entering the bottom of each tower and passing out of the top. Line 20 served to transport the flue gas from tower 24 to 25. Line 27 served to transport the flue gas from tower 25 to tower 26. Finally, the spent flue gas was discharged through vent 28 at the rate of 2127.4 pounds per hour. It gave the following analysis:

| Component: | Weight percent |
|---|---|
| HCl | 0.1 |
| $CO_2$ | 12.2 |
| $N_2$ | 59.8 |
| $SiF_4$ | 0.1 |
| $H_2O$ | 27.7 |

Temperatures in acidulation towers 24, 25 and 26 were 98°, 94° and 91°, respectively, and pressures were essentially atmospheric. Acidulate was withdrawn through line 39 at the rate of 786.8 pounds per hour with analysis as follows:

| Component: | Weight percent |
|---|---|
| $H_3PO_4$ | 8.8 |
| HCl | 0.6 |
| $CaCl_2$ | 18.6 |
| $SiF_4$ | 0.6 |
| $AlCl_3$ | 0.9 |
| $FeCl_3$ | 0.2 |
| $MgCl_2$ | 0.2 |
| $SiO_2$ | 1.1 |
| Organic carbon | 0.3 |
| $H_2O$ | 65.8 |
| Other | 2.9 |

The acidulate was pumped by filter pump 41 to acidulate filter 42 where wet insolubles were separated and discarded at the rate of 28.3 pounds per hour through line 43. The crude phosphoric acid solution was then transferred to extractor 45 through line 44 at rate of 758.5 pounds per hour with analysis as follows:

| Component: | Weight percent |
|---|---|
| $H_3PO_4$ | 9.1 |
| $CaCl_2$ | 19.2 |
| HCl | 0.6 |
| Carbon | 0.2 |
| $H_2O$ | 67.6 |
| $SiF_4$ | 0.5 |
| $AlCl_3$ | 0.9 |
| $FeCl_3$ | 0.2 |
| $MgCl_2$ | 0.2 |
| Other | 1.4 |

This aqueous phosphoric acid solution was purified in extractor 45 wherein phosphoric acid was separated by extraction with 900 pounds per hour of isoamyl alcohol. The brine raffinate was discharged through line 6 with the aid of brine recycle pump 53. A brine bleed was taken through line 54 amounting to 61.2 pounds per hour and the remaining brine was recycled through line 6 to feed mixing tank 1 at the rate of 550.7 pounds per hour with analysis as follows:

| Component: | Weight percent |
|---|---|
| $CaCl_2$ | 22.8 |
| $AlCl_3$ | 1.3 |
| $FeCl_3$ | 0.3 |
| $H_3PO_4$ | 0.6 |
| $MgCl_2$ | 0.2 |
| Organic carbon | 0.3 |
| Other | 1.8 |
| $H_2O$ | 72.9 |

The alcoholic extract phase was withdrawn from extractor 45 through line 55. The extract phase was then passed through solvent filter 56 where residual amounts of suspended solids were removed and withdrawn through filter discard line 59. The clarified extract was then passed through line 58 into solvent washer 57 where it was washed with 550 pounds per hour of water supplied through line 61. In this way, the phosphoric acid is obtained as a dilute aqueous solution (containing a little hydrogen chloride) which is withdrawn through line 62. The organic solvent raffinate was returned to solvent reservoir 46 through line 49 with the aid of solvent recycle pump 66. The dilute phosphoric acid was concentrated in phosphoric acid concentrator 63. Excess water (and hydrogen chloride) were discharged through line 65. Purified phosphoric acid was withdrawn from concentrator 63 through line 64 at the rate of 81.7 pounds per hour with analysis as follows:

| Component: | Weight percent |
|---|---|
| $H_3PO_4$ | 80.0 |
| $H_2O$ | 19.9 |
| $FeCl_3$ | 0.1 |
| $AlCl_3$ | Trace |
| $SiF_4$ | Trace |
| Solvent | Trace |

The yield of cement material from reactor 3 was 1 pound per 0.50 pound of alumina sand, and per 0.84 pound of phosphate rock. The yield of phosphoric acid (analyzed as $P_2O_5$) was 93.1% of theory (based on phosphate rock).

We wish to emphasize that the above set of reaction conditions may be varied with regard to flow rates depending on the scale at which the process of our invention is conducted. The drawing of the apparatus and description of the handling techniques is also not intended to be inclusive. Minor changes therein and modifications thereof may be made without departing from the scope of the specification and appended claims.

We claim:
1. A process for the production of phosphoric rock and calcium aluminate from alumina sand and phosphate rock which comprises the combination of:
   (a) maintaining in a fluidized state by means of a stream of gas a bed of particles comprising calcium aluminate and alumina sand and containing less than about 15% by weight of calcium chloride,
   (b) maintaining a temperature of between about 600° C. and about 1300° C. within the fluidized bed,
   (c) adding to the bed a hydrated calcium chloride composition and alumina sand in amounts such that the molar proportion of alumina to calcium chloride is at least about 0.85:1, said alumina sand having a feed particle size of between about 5 and about 100 U.S. mesh,
   (d) dispersing and burning within the fluidized bed a fluid hydrocarbon fuel in a likewise dispersed stream of air at such a rate that the bed is expanded about 20% to about 70% over its volume when in a non-fluidized state,
   (e) effecting reaction between the hydrated calcium chloride composition and alumina sand, whereby calcium aluminate and gaseous hydrogen chloride-containing products of said reaction are evolved,
   (f) separating the gaseous products of said reaction and said burning from the fluidized bed as flue gas,
   (g) withdrawing calcium aluminate from the fluidized bed,
   (h) countercurrently contacting the flue gas with a moving aqueous slurry of phosphate rock particles at a temperature between about 85° C. and 110° C. at about atmospheric pressure, whereby a phosphoric acid-containing acidulate is formed, said aqueous slurry containing between about 10% and about 50% by weight of phosphate rock, about 80% of said phosphate rock particles having a size below about 50 U.S. mesh,
   (i) withdrawing the phosphoric acid-containing acidulate,
   (j) discharging the flue gas after said contacting thereof with the aqueous slurry of phosphate rock particles, said flue gas being substantially freed of hydrogen during said contacting,
   (k) extracting the acidulate with a phosphoric acid-miscible, calcium chloride brine-immiscible solvent, whereby a mutually immiscible calcium chloride-containing brine phase and phosphoric acid-containing extract phase are formed, and
   (l) separating the phosphoric acid from said extract phase whereby a raffinate is formed, said raffinate being continually recycled as phosphoric acid-miscible, calcium chloride brine-immiscible solvent to step (k).

2. A process according to claim 1 wherein the flue gas obtained in step (f) is freed of suspended solids and wherein said flue gas is brought into thermal contact with the air used in step (d) to effect heat exchange between the flue gas and said air.

3. A process according to claim 1 wherein:
the bed of particles in step (a) contains less than about 3% by weight of calcium chloride,
the temperature of the bed in step (b) is maintained between about 700° C. and about 950° C.,
the molar proportion of alumina to calcium chloride in step (c) is between about 0.85:1 and about 3:1, said alumina sand having a feed particle size of between about 10 and about 50 U.S. mesh,
the fluid hydrocarbon fuel and air are dispersed within the fluidized bed in step (d) at such a rate that the bed is expanded about 30% to about 50% over its volume when in a non-fluidized state,
the flue gas obtained in step (f) is freed of suspended solids, said solids being thereafter returned to the fluidized bed,
the flue gas is brought into thermal contact with the air to be used in step (d) to effect heat exchange whereby the flue gas is cooled to a temperature of between about 350° C. and about 450° C.,
the contacting of the flue gas with the aqueous slurry of phosphate rock in step (h) is conducted at a temperature between about 90° C. and about 99° C. at about atmospheric pressure,
the acidulate in step (k) is extracted with a phosphoric acid-miscible, calcium chloride brine-immiscible solvent selected from the group consisting of n-butanol, sec-butanol, the pentanols, triethyl phosphate, and N,N-disubstituted amides said amides being derived from monocarboxylic acids having from 1 to 3 carbon atoms and from N,N-dialkyl amines whose alkyl groups contain from 1 to 2 carbon atoms, and
the calcium chloride-containing brine phase in step (k) is recycled as hydrated calcium chloride composition to step (c).

4. A process according to claim 3 wherein all the steps contained therein are performed in a continuous manner.

5. A process according to claim 4 wherein the flue gas thermally contacted with the air to be used in step (d) is cooled to a temperature of between about 400° C. and about 425° and wherein the acidulate in step (k) is extracted with isoamyl alcohol.

References Cited

UNITED STATES PATENTS

| 1,000,290 | 8/1911 | Peacock | 23—52 |
| 1,282,222 | 10/1918 | Hall et al. | 23—52 |
| 2,469,989 | 5/1949 | Pyzel | 23—52 X |
| 3,257,219 | 6/1966 | Klein | 23—52 X |

OTHER REFERENCES

Mikhailor et al., "Chemical Abstracts," vol. 61, November 1964, p. 12971.

Ohama, "Chemical Abstracts," vol. 53, p. 22776.

HERBERT T. CARTER, Primary Examiner

U.S. Cl. X.R.

23—9A 154, 165; 106—100, 104

PO-1050
(5/69)

UNITED STATES PATENT OFFICE
CERTIFICATE OF CORRECTION

Patent No. 3482933      Dated December 9, 1969

Inventor(s) W. P. Moore and R. R. MacGregor

It is certified that error appears in the above-identified patent and that said Letters Patent are hereby corrected as shown below:

Claim 1, column 8, line 65, after "hydrogen" insert

-- chloride --

SIGNED AND
SEALED
JUN 2 1970

(SEAL)
Attest:

Edward M. Fletcher, Jr.
Attesting Officer

WILLIAM E. SCHUYLER, JR.
Commissioner of Patents